United States Patent
Khokle

(10) Patent No.: US 12,015,256 B2
(45) Date of Patent: Jun. 18, 2024

(54) PUSH-IN CONDULET DEVICES, ASSEMBLIES, SYSTEMS AND METHODS FOR ELECTRICAL RACEWAY FABRICATION

(71) Applicant: EATON INTELLIGENT POWER LIMITED, Dublin (IE)

(72) Inventor: Himanshu Gangadhar Khokle, Maharashtra (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 26 days.

(21) Appl. No.: 17/559,584

(22) Filed: Dec. 22, 2021

(65) Prior Publication Data
US 2022/0200254 A1    Jun. 23, 2022

Related U.S. Application Data

(60) Provisional application No. 63/129,879, filed on Dec. 23, 2020.

(51) Int. Cl.
    *H02G 3/06*      (2006.01)
(52) U.S. Cl.
    CPC ................. *H02G 3/0691* (2013.01)
(58) Field of Classification Search
    CPC .................................................... H02G 3/0691
    See application file for complete search history.

(56) References Cited

U.S. PATENT DOCUMENTS

| | | | | |
|---|---|---|---|---|
| 1,822,056 A | * | 9/1931 | Noble | H02G 3/065 285/179 |
| 4,836,580 A | * | 6/1989 | Farrell | F16L 37/0985 285/133.11 |
| 5,029,908 A | * | 7/1991 | Belisaire | F16L 37/0982 285/323 |
| 5,803,512 A | * | 9/1998 | Hollnagel | F16L 37/084 285/424 |

(Continued)

OTHER PUBLICATIONS

Pro-Pipe Solutions Revolutionary Pipe Assembly Tool—Eagle Claw Operation Guide, available at <http://propipesolutions.com/>.

(Continued)

*Primary Examiner* — Timothy J Thompson
*Assistant Examiner* — Rhadames Alonzo Miller
(74) *Attorney, Agent, or Firm* — Squire Patton Boggs (US) LLP

(57) ABSTRACT

A condulet assembly for fabricating a metal conduit raceway of an electrical system is provided. The condulet assembly includes a condulet and a clamp assembly. The condulet includes a condulet body and a mouth including a mouth wall. The mouth wall further includes a plurality of first sloped recesses positioned circumferentially in an interior of the mouth wall, each of the plurality of first sloped recesses including a first slope that has a first end and a raised end positioned opposite the first end and more distal to the rim than the first end. The clamp assembly includes a clamp ring and a plurality of clamps each including a longitudinal portion and a claw, the longitudinal portion extending longitudinally from the clamp ring, and the claw extending transversely and inwardly from the longitudinal portion. Each of the clamps is sized to be received in one of the first sloped recesses.

20 Claims, 9 Drawing Sheets

(56) References Cited

U.S. PATENT DOCUMENTS

| | | | | |
|---|---|---|---|---|
| 6,199,920 B1* | 3/2001 | Neustadtl | F16L 37/0985 | 285/903 |
| 7,201,382 B2* | 4/2007 | Viegener | F16L 37/0845 | 277/611 |
| 7,316,429 B2* | 1/2008 | Viegener | F16L 37/091 | 285/307 |
| 7,481,462 B2* | 1/2009 | Arning | F16L 5/027 | 285/414 |
| 7,587,924 B2* | 9/2009 | Viegener | B21K 1/16 | 285/382.4 |
| 7,980,600 B2* | 7/2011 | Hofmann | F16L 37/12 | 285/322 |
| 8,025,315 B2* | 9/2011 | Schreckenberg | F16L 13/142 | 285/248 |
| 8,262,138 B2* | 9/2012 | Rischen | F16L 13/146 | 285/323 |
| 8,480,134 B2* | 7/2013 | Crompton | F16L 37/0915 | 29/521 |
| 8,517,431 B2* | 8/2013 | Arning | F16L 13/141 | 285/256 |
| 9,249,907 B2* | 2/2016 | Mester | F16L 13/142 | |
| 2003/0038481 A1* | 2/2003 | Viegener | F16L 37/091 | 285/104 |
| 2011/0049875 A1* | 3/2011 | Stults | F16L 13/142 | 285/345 |
| 2012/0161438 A1* | 6/2012 | Rischen | F16L 13/142 | 285/382 |
| 2015/0354738 A1* | 12/2015 | Morse | H02G 15/013 | 285/39 |
| 2017/0356576 A1* | 12/2017 | Shemtov | F16L 19/07 | |
| 2019/0067922 A1* | 2/2019 | Platt | F16L 37/091 | |
| 2019/0288494 A1* | 9/2019 | Morse | H02G 3/0481 | |
| 2020/0248853 A1* | 8/2020 | Kimura | H02G 9/10 | |

OTHER PUBLICATIONS

Eaton Crouse-Hinds LB27 Condulet, available at <https://www.eaton.com/us/en-us/skuPage.LB27.html>.

"The Basics of Steel Conduit", EC&M, accessed on Nov. 12, 2020, available at <https://www.ecmweb.com/content/article/20888282/the-basics-of-steel-conduit>.

EMT SIMPush Couplings, Southwire Tools accessed on Nov. 18, 2020, available at <http://www.southwiretools.com/tools/tools/EMT-SIMPush-Couplings?override=desktop>.

\* cited by examiner

PUSH-IN CONDULET DEVICES, ASSEMBLIES, SYSTEMS AND METHODS FOR ELECTRICAL RACEWAY FABRICATION

CROSS-REFERENCE TO RELATED APPLICATION

This application claims the benefit of U.S. Provisional Patent Application Ser. No. 63/129,879, filed on Dec. 23, 2020, the disclosure of which is hereby incorporated by reference in its entirety.

BACKGROUND

The field of the disclosure relates generally to raceways for electrical systems, and more particularly to push-in condulet assemblies and methods for interconnecting electrical conduits by pushing the conduits into the condulet.

Rigid Metal Conduit (RMC) and Intermediate Metal Conduit (IMC) raceways are often used to carry and protect electrical wiring or cabling in an electrical system of an industrial facility, such as gas stations, refineries, and power plants. Conventional RMC and IMC raceways are constructed by coupling lengths of threaded RMC or IMC conduits together with threaded couplers. Couplers may also be referred to as condulets, condulet fittings, outlet boxes, or hubs. Condulets also provide access points to the wires to assist in pulling wires through the conduit raceway system over large distances. Condulets are known to effect a change in the direction of a conduit and cabling in an RMC raceway.

While known condulets are effective in providing desired interconnections of conduits, they are laborious to install and prone to certain problems, and improvements are desired.

BRIEF DESCRIPTION OF THE DRAWINGS

Non-limiting and non-exhaustive embodiments are described with reference to the following figures, wherein like reference numerals refer to like parts throughout the various drawings unless otherwise specified.

FIG. 9A shows an exemplary condulet assembly before inserting a conduit into the condulet.

FIG. 9B shows the conduit and the condulet assembly shown in FIG. 9A after the conduit is partially inserted into the condulet assembly.

FIG. 9C shows the conduit and the condulet assembly shown in FIG. 9A after the conduit is fully inserted into the condulet assembly.

DETAILED DESCRIPTION

Conventional condulets provide interconnection of metal conduits such as rigid metal conduits (RMC) or intermediate metal conduits (IMC) in fabrication of a wire or cable raceway for an electrical system. Threaded attachment of metal conduits to one another and to threaded condulets is conventionally performed in the fabrication of raceways, but is sub-optimal in some aspects.

For example, when a length of threaded conduit exceeds a length needed for a given installation, the conduit is cut and new threads are typically formed on the remaining unthreaded end after cutting such that the conduit can still be coupled to a threaded condulet. However, forming new threads on the cut conduit is time-consuming, dangerous, and laborious, thus increasing the cost, risk, and time to construct a raceway. Moreover, forming threads on an end of a conduit that has been cut without creating imperfections (e.g., an angled end of the conduit, or burrs and the like on the inside or outside of the conduit) in the connections requires a level of skill that the average worker may or may not possess. Burrs and the like may damage the insulation of electrical wires or cables being pulled through the conduit and/or the threaded connection between the conduit and the condulet, resulting in undesirable reliability issues.

Further, threading machines are large and expensive, and require time to set them up and tear them down. The machines are often located away from the primary work area, resulting in lost time in transporting materials to and from the threading machines. Moreover, because the threading machines use sharp steel tools and cutting oil for forming threads, safety and clean-up issues also need to be addressed.

Systems and methods described herein allow fabrication of raceways without creation of threads on conduits. Conduits are coupled to a condulet assembly by pushing the conduits into the condulet assembly such that clamps and/or flaps are locked in sloped recesses in the condulet and/or the claws holds and penetrate the exterior of the conduit. Sealing of the raceway is provided by gaskets. The assemblies, systems, and methods meet longstanding and unfulfilled needs in the art in simplifying raceway fabrication, allowing dramatic reduction in time and labor costs to complete a raceway installation while ensuring reliability of the mechanical and electrical interconnections. For example, using the systems and methods described herein results in 35% to 50% time savings in fabrication of raceways, compared to the known method of using threaded connections. Coupling without threads also avoids the issue of unprotected metal surfaces created by threading that corrodes and places grounding at risk.

Figure 1A:
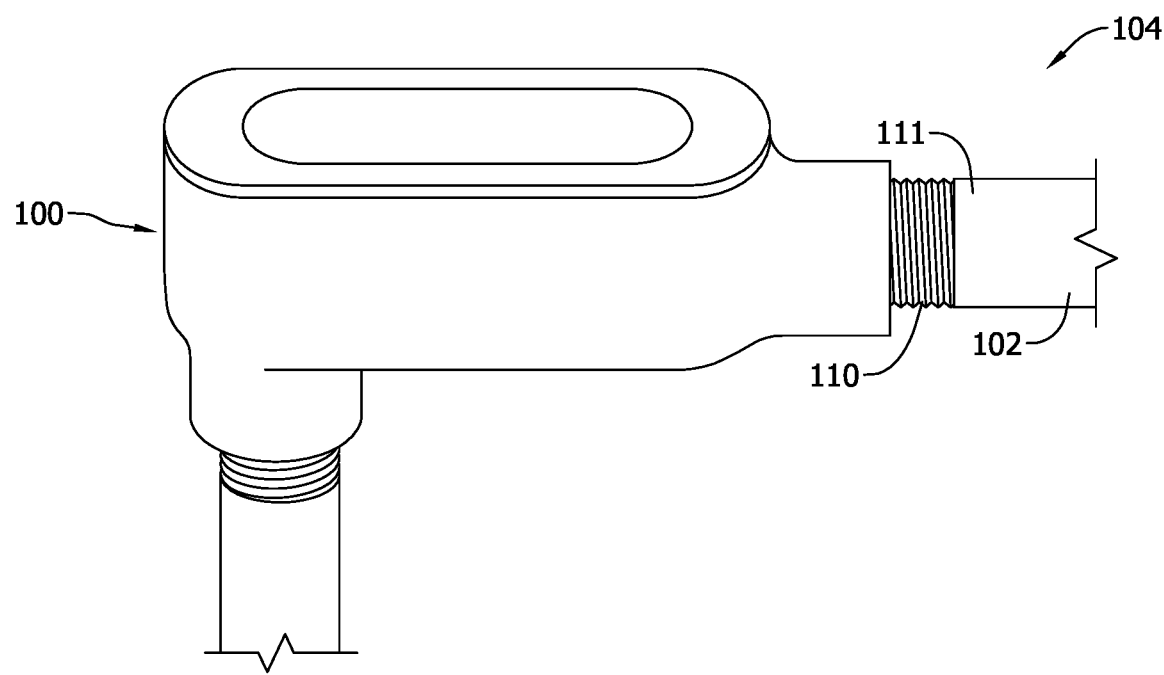
FIG. 1A is a perspective view of a rigid metal conduit (RMC) raceway fabricated with an exemplary known condulet.
Figure 1B:
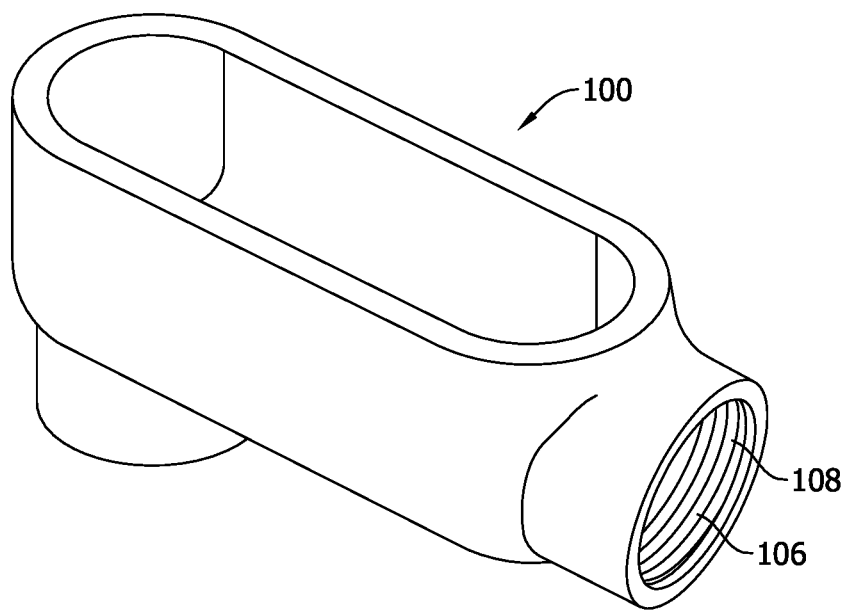
FIG. 1B is a top perspective view of the condulet shown in FIG. 1A with the cover for the access opening removed.

FIGS. 1A and 1B show a known condulet 100 for connecting conduits 102 in assembling an RMC raceway 104 of an electrical system. FIG. 1A shows the raceway 104 and FIG. 1B is a top perspective view of the condulet 100 by itself. The condulet 100 includes threads 106 in its inner wall 108. Threads 110 must be formed on an exterior of the conduit 102 at a conduit end 111 of the conduit 102 to couple the conduit 102 with the condulet 100. Moreover, the threads 110 on the conduit 102 and the threads 106 inside the condulet 100 must be able to mate with each other in order to couple the conduit 102 with the condulet 100.

Figure 2A:
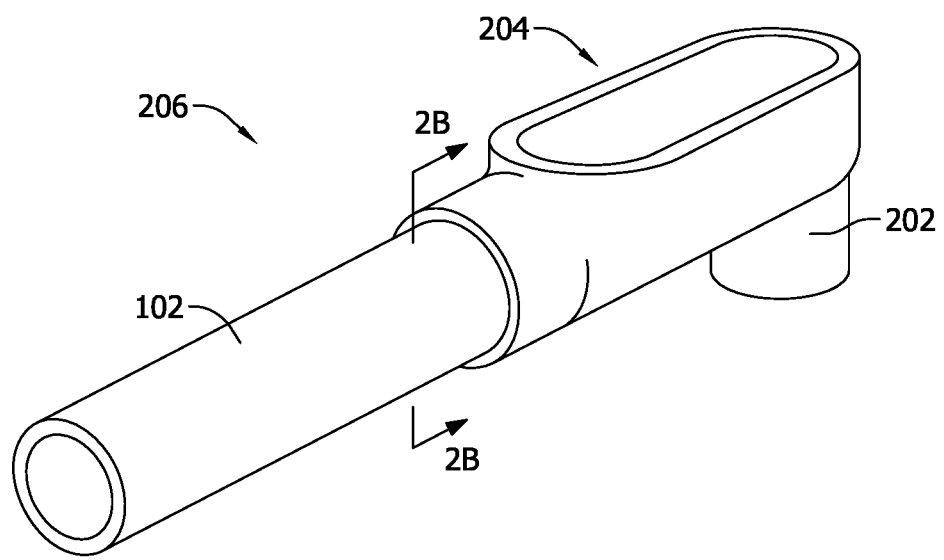
FIG. 2A is a perspective view of an exemplary raceway.
Figure 2B:
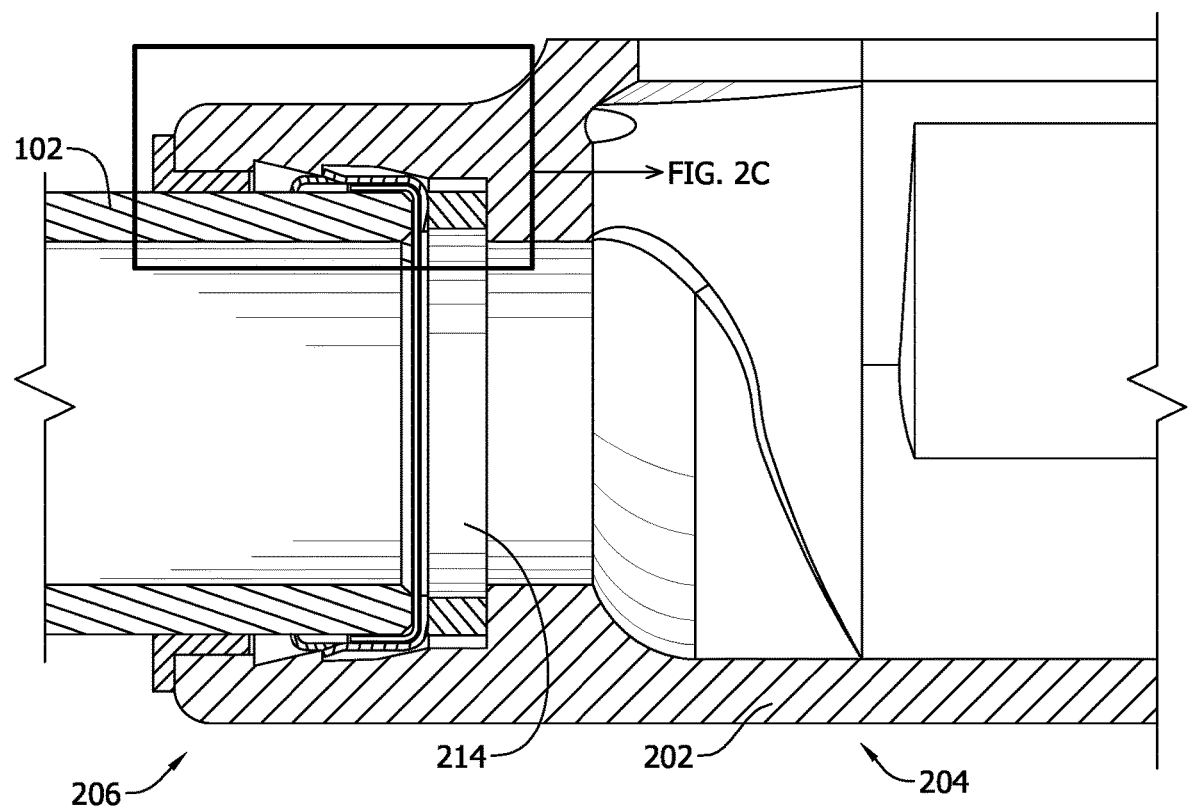
FIG. 2B is a cross-sectional view of the raceway shown in FIG. 2A along line 2B-2B in FIG. 2A.
Figure 2C:
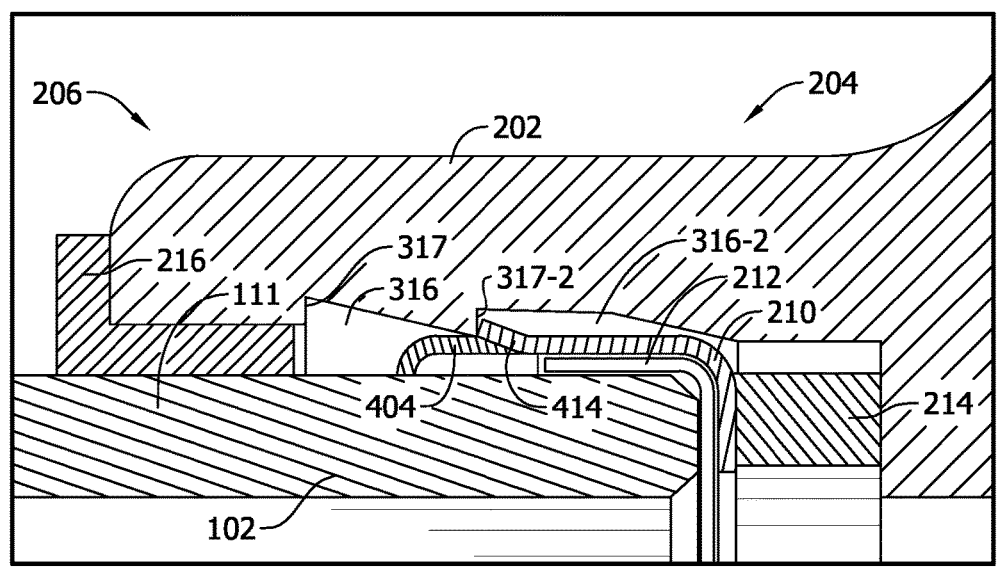
FIG. 2C is an enlarged view of the raceway shown in FIG. 2B.

FIGS. 2A-2C show an exemplary condulet 202 and exemplary condulet assembly 204 for connecting the conduit 102 in assembling a raceway 206 for an electrical system. FIG. 2A shows the assembled raceway 206. FIG. 2B is a cross-sectional view of part of the raceway 206 along line 2B-2B. FIG. 2C is an enlarged view of a section marked in FIG. 2B. To assemble the raceway 206, the conduit 102 is pushed into the condulet assembly 204 and locked in place by the condulet assembly 204.

The condulet assembly 204 disclosed herein is configured to couple to the conduit 102 that is an RMC or an IMC of a similar size to the RMC. Both RMC and IMC are conduits in use to assemble a raceway for an electrical system. Compared with an IMC, an RMC has a thicker conduit wall than an IMC and therefore is heavier than an IMC. RMC and IMC conduits are fabricated from steel and in standard trade sizes. The trade sizes reflect the dimension of the outer diameter of the RMC and IMC. That is, the RMC and IMC of the same trade size have similar outer diameters, and the inner diameters of the RMC and IMC of the same trade size are significantly different because the conduit walls of the RMC and IMC have different thicknesses. For example, an RMC of size 4 has an outer diameter of 114.3 mm (4.5 inches (in.) and an inner diameter of 102.9 mm (4.05 in.), while an IMC of size 4 has an outer diameter of 113.4 mm (4.47 in.) and an inner diameter of 106.8 mm (4.2 in.).

In the exemplary embodiment, the condulet assembly 204 includes the condulet 202 and a clamp assembly 210 (FIG. 2C). The condulet assembly 204 may further include a first gasket 212 and/or a second gasket 214. The condulet assembly 204 may also include a guide ring 216.

In operation, to assemble the raceway 206, the clamp assembly 210 is inserted into the condulet 202, and the conduit is pushed into the condulet 202 until the clamp assembly 210 is locked with the condulet 202. In some embodiments, the first gasket 212 and the second gasket 214 may be placed in front and behind the clamp assembly, respectively, to provide a seal that prevents dust and/or water from entering into the raceway 206. The guide ring 216 may be used to guide insertion of the conduit 102 into the condulet assembly 204.

Figure 3A:
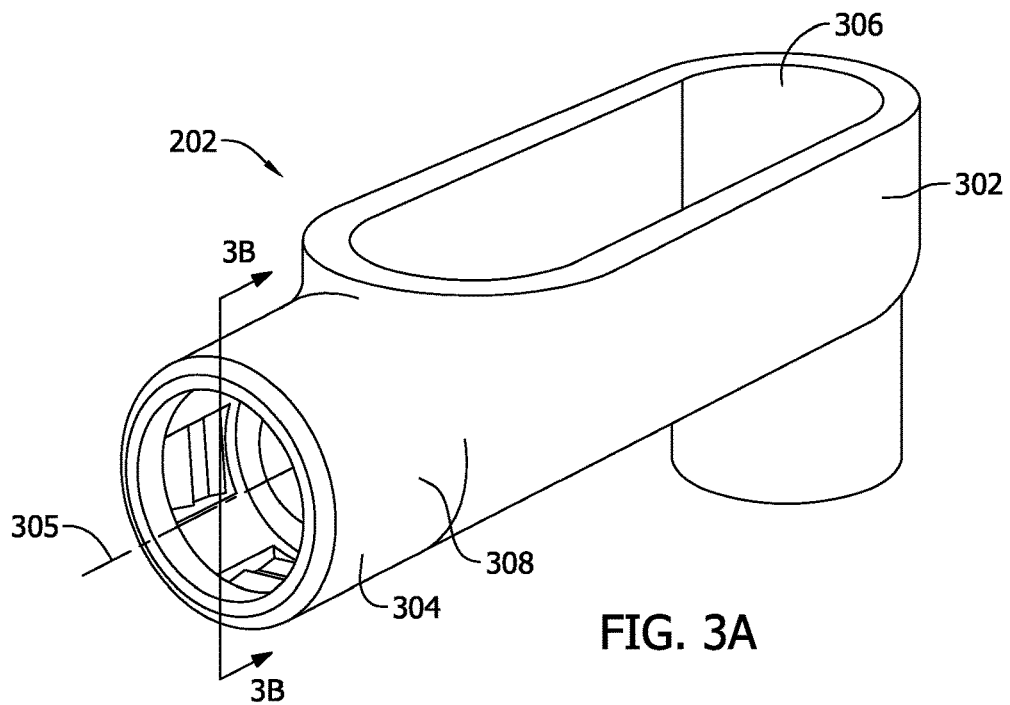
FIG. 3A is a perspective view of an exemplary condulet in the raceway shown in FIG. 2A.
Figure 3B:
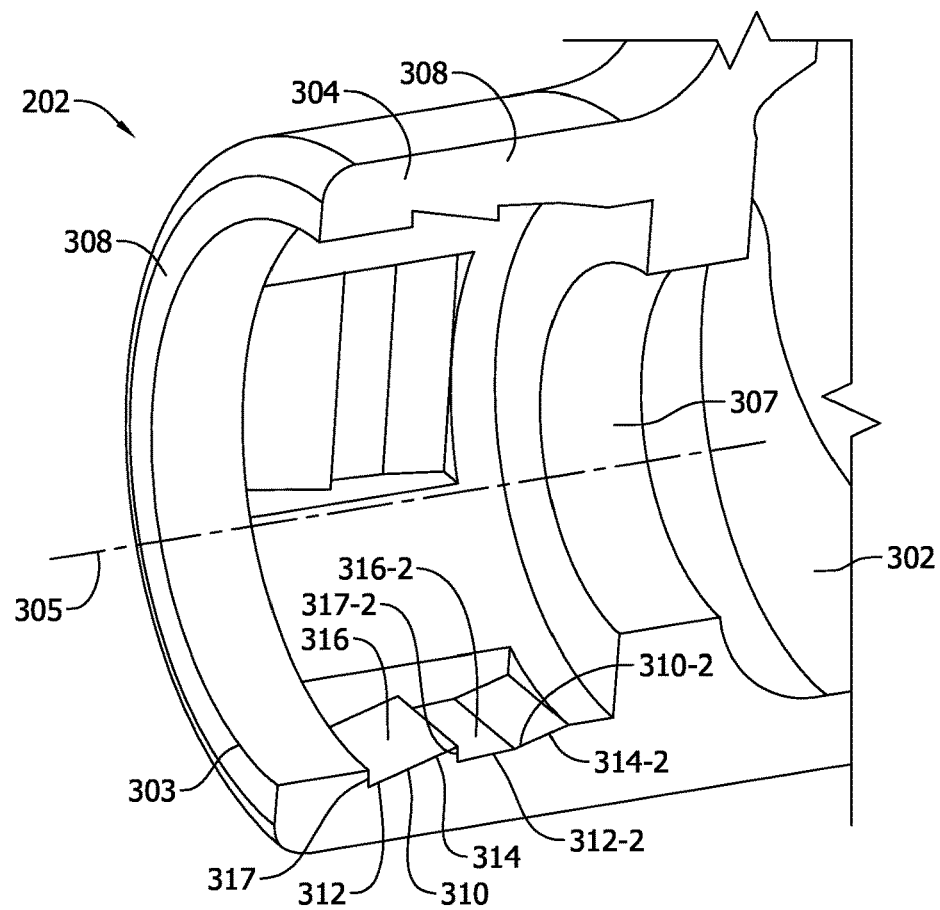
FIG. 3B is a cross-sectional view of the condulet shown in FIG. 3A along line 3B-3B.

FIGS. 3A and 3B show the exemplary condulet 202. FIG. 3A is a perspective view of the condulet 202. FIG. 3B is a cross-sectional partial view of the condulet 202 along line 3B-3B.

In the depicted example, the condulet 202 includes a condulet body 302 and a mouth 304 extending from the condulet body 302. A rim 303 of the mouth 304 or an axial cross-section of the mouth 304 may be in the shape of a circle, or other shapes that conform with the shape of the cross-section of the conduit 102. The number of mouths 304 included in the condulet 202 may be one, two, or more than two. The plurality of mouths 304 of a condulet 202 may be the same, or may be different to couple conduits 102 of different dimensions or shapes. The condulet 202 shown in FIGS. 2A and 3A includes two mouths 304. The condulet 202 may include an access opening 306 that provides access to the wires inside the condulet 202. The condulet 202 may further include a shoulder 307 formed between the mouth 304 and the condulet body 302. The shoulder 307 prevents a conduit 102 from being inserted too far into the condulet 202. The condulet 202 may be fabricated from metal. The condulet 202 may be fabricated by casting. The condulet 202 is formed integrally as one single piece, where the mouth 304 and the condulet body 302 are formed as one piece, and coupled to each other without separate fasteners.

In the exemplary embodiment, the mouth 304 includes a mouth wall 308. The mouth 304 may have a longitudinal axis 305. The mouth wall 308 may extend from the condulet body 302 along a direction of the longitudinal axis 305. The mouth wall 308 includes a first slope 310 in the interior of the mouth wall 308. The first slope 310 includes a first end 312 and a raised end 314 that is raised relative to the first end 312. That is, the raised end 314 extends further toward the longitudinal axis 305 of the mouth 304 than the first end 312. The first end 312 is positioned more proximate to the rim 303 than the raised end 314. The mouth wall 308 further includes a first recess wall 317 proximate the first end 312 of the first slope 310. The first recess wall may extend substantially perpendicularly to the mouth wall 308. The first recess wall 317 and the first slope 310 form a first sloped recess 316, where the first sloped recess 316 recedes further from the interior of the mouth wall 308 than the area in the interior of the mouth wall 308 adjacent to the first sloped recess 316.

The mouth wall 308 may include a second slope 310-2. Similarly, the second slope 310-2 includes a first end 312-2 and a raised end 314-2 that is raised relative to the first end 312-2, where the raised end 314-2 extends further toward the longitudinal axis 305 than the first end 312-2. The raised end 314-2 is more distal to the rim 303 than the first end 312-2. The mouth wall 308 may further include a second recess wall 317-2 proximate the first end 312-2 of the second slope 310-2. The second recess wall 317-2 may extend substantially perpendicularly to the mouth wall 308. The second slope 310-2 and the second recess wall 317-2 form a second sloped recess 316-2, which recedes further from the interior of the mouth wall 308 than the area in the interior of the mouth wall 308 adjacent to the second sloped recess 316-2. In some embodiments, the second slope 310-2 is smaller than the first slope 310, where the height difference between the raised end 314-2 and the first end 312-2 of the second sloped recess 316-2 is smaller than the height difference between the raised end 314 and the first end 312 of the first sloped recess 316.

Figure 4A:
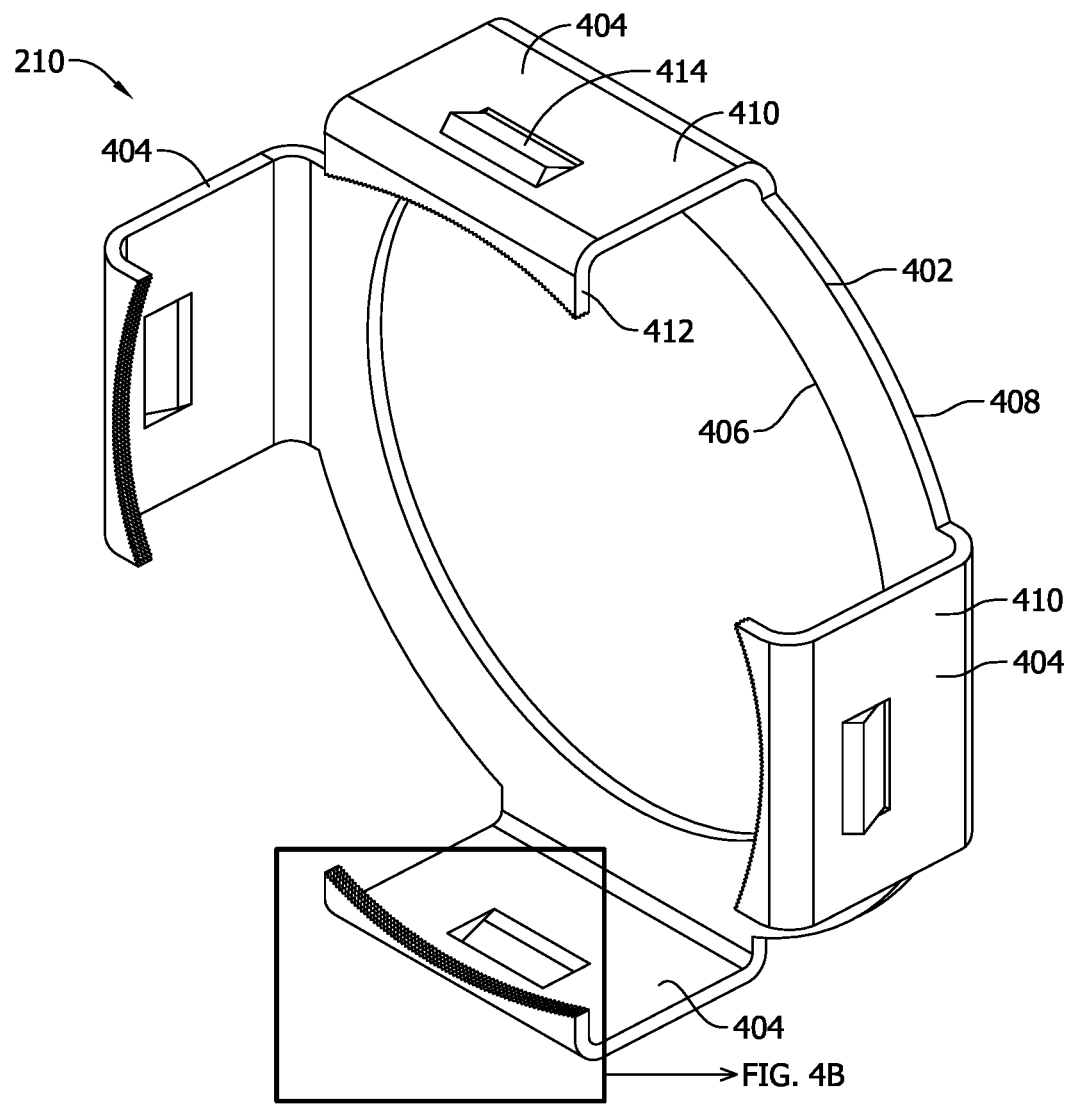
FIG. 4A is a perspective view of an exemplary clamp assembly in the condulet assembly of the raceway shown in FIG. 2A.
Figure 4B:
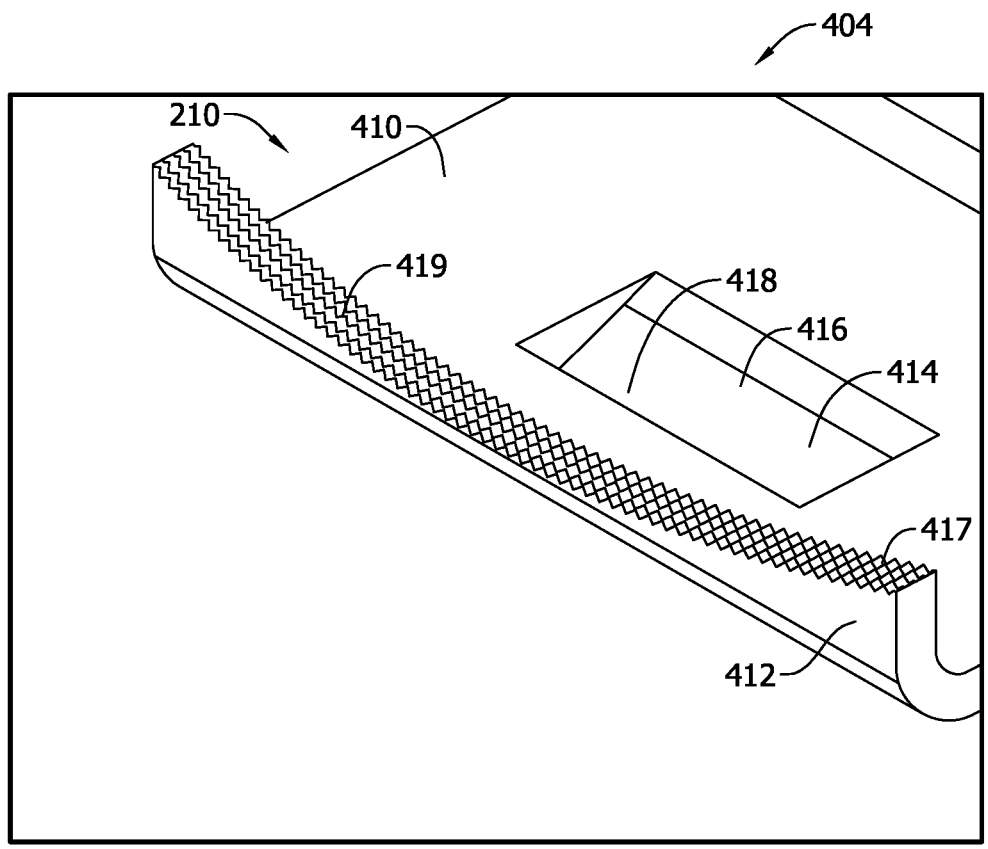
FIG. 4B is an enlarged view of the clamp assembly shown in FIG. 4A.

FIGS. 4A and 4B show the exemplary clamp assembly 210. FIG. 4A is a perspective view of the clamp assembly 210. FIG. 4B is an enlarged view of a section of the clamp assembly 210 as marked in FIG. 4A. In the exemplary embodiment, the clamp assembly 210 includes a clamp ring 402 and a plurality of clamps 404. The clamp ring 402 has an interior rim 406 and an exterior rim 408. The exterior rim 408 conforms to the interior shape of the mouth wall 308. In the depicted example, the interior rim 406 is in the shape of a circle. The interior rim 406 may also have other shapes, such as an oval.

In the exemplary embodiment, the clamp 404 includes a longitudinal portion 410 and a claw 412. The longitudinal portion 410 extends longitudinally from the exterior rim 408 of the clamp ring 402. The longitudinal portion 410 may further include a flap 414. The flap 414 includes a first end 416 and a second end 418 opposite the first end 416 (FIG. 4B). The flap 414 extends from the longitudinal portion 410 at the first end 416 and outwards away from the longitudinal portion 410. In the depicted example, the flap 414 is rectangular. The flap may be in other shapes that enable the flap 414 to function as described herein. In one example, the flap 414 is manufactured by cutting along three edges of the flap 414, leaving the edge at the first end 416 intact, and then flexing the flap 414 outwards and away from the longitudinal portion 410.

In the depicted example, the longitudinal portion 410 extends transversely inward and forms the claw 412. A rim 417 of the claw 412 may be in a shape that conforms with an exterior of the conduit 102 such that the claw 412 pushes against and may bite into the exterior of the conduit 102 along the rim 417 when the claw 412 is pushed toward the conduit 102. The claw 412 may further include serrations 419 positioned on the rim 417. The serrations 419 may penetrate into the exterior of the conduit 102 and increase the traction between the claw 412 and the conduit when the claw 412 is coupled with and pushed against the conduit 102.

In the exemplary embodiment, the clamp assembly 210 includes four clamps 404. The clamp assembly 210 may include any other number of clamps 404, such as two, three, or six. The clamps 404 may be equally spaced along the clamp ring 402 such that the traction between the clamps 404 and the conduit 102 is balanced across the circumference of the conduit 102 to provide a secure and balanced coupling between the conduit 102 and the condulet assembly 204. In some embodiments, the clamps 404 are arranged in pairs, and the clamps 404 in each pair are symmetrical such that the hold by the clamps 404 to the conduit 102 is balanced between the pair.

In the depicted example, the clamp assembly 210 is manufactured as one piece. The clamp assembly 210 may be fabricated from metal sheets, such as steel sheets. Heat treatment may be performed on the steel sheets to alter the hardness of the steel sheets. The clamp assembly 210 may be manufactured by stamping, cutting, stamping, and bending.

In operation, to connect the conduit 102, the clamp assembly 210 is first placed inside the mouth 304 of the condulet 202, and then the conduit 102 is pushed into the mouth 304. The conduit end 111 then hits the clamp ring and pushes the clamp assembly 210 further into the mouth 304 of the condulet 202. When the claw 412 passes the first recess wall 317 of the first sloped recess 316, the claw 412 is disposed within the first sloped recess 316 (see FIGS. 2B and 2C). When the clamp 404 is disposed in the first sloped recess 316 and the longitudinal portion of the clamp 404 hits the first slope 310, a click may be produced, indicating the coupling of the clamp 404 with the first sloped recess 316. The clamp assembly may be pushed further into the mouth 304 of the condulet 202. When the flap 414 in the longitudinal portion 410 of the clamp 404 passes the second recess wall 317-2, the flap 414 is disposed in the second sloped recess 316. Similarly, a click may be produced, indicating the lodging of the flap 414 in the second sloped recess 316-2. The assembled raceway 104 is secure because when the conduit 102 is being pulled outwards, the clamp 404 and/or the flap 414 pushes against the first recess wall 317 and/or the second recess wall 317-2, stopping the conduit 102 from being pulled out of the condulet 202. In addition, the serrations 419 of the claws 412 penetrate into the conduit 102, further increasing the secureness of the coupling between the conduit 102 and the condulet assembly 204.

Figure 5:
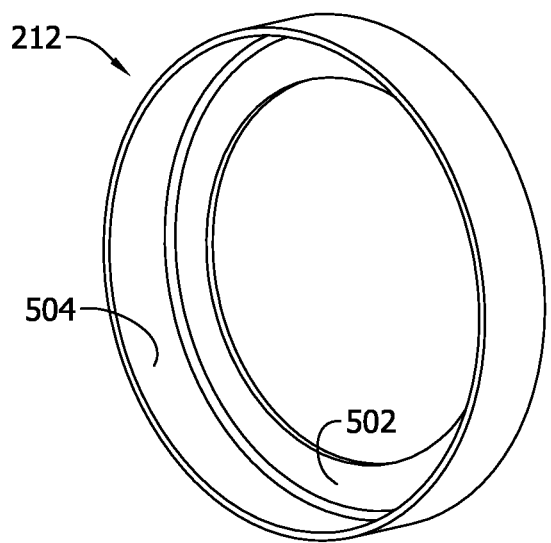
FIG. 5 is a perspective view of an exemplary first gasket in the condulet assembly of the raceway shown in FIG. 2A.

FIG. 5 is a perspective view of an exemplary first gasket 212. In the exemplary embodiment, the first gasket 212 includes a gasket ring 502 and a gasket skirt 504 extending from the gasket ring 502. The gasket ring 502 is circular in the depicted embodiment. The gasket ring 502 may be in other shapes that conform with the shape of the cross-section of the conduit 102. The first gasket 212 is fabricated from an elastic material, such as rubber or silicone.

Figure 9A:
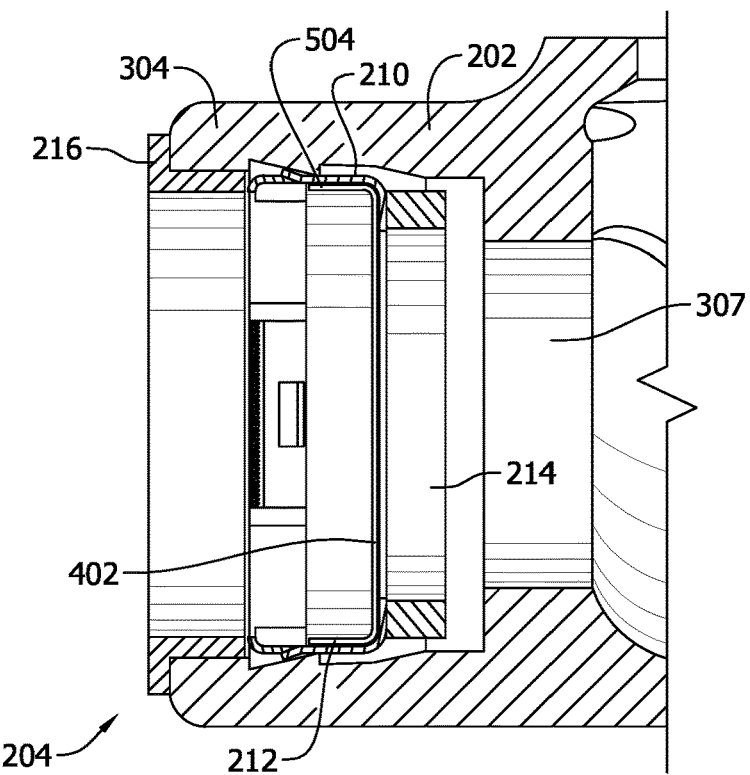
FIGS. 9A-9C are schematic diagrams illustrating the method shown in FIG. 8.
Figure 9B:
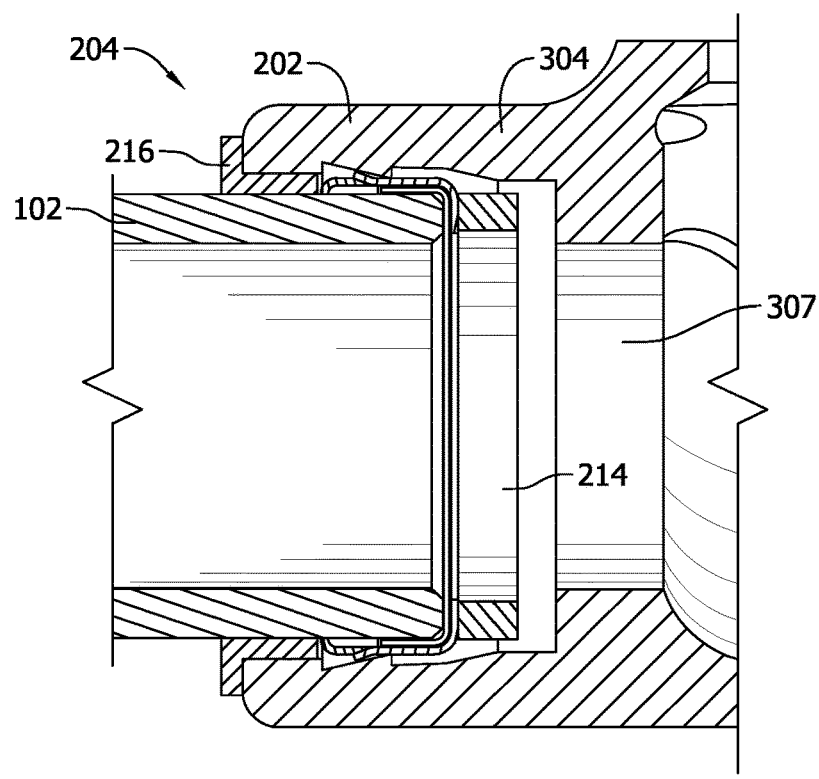

In operation, the first gasket 212 is placed inside the clamp assembly 210 (see FIG. 2B and FIG. 9A shown later). The gasket ring 502 is placed against the clamp ring 402 and the gasket skirt 504 lines interior to the clamps 404. The first gasket 212 provides a first seal for the raceway 104 that prevents dust and/or water from entering into the raceway 104 through the space between the mouth 304 and the exterior of the conduit 102 and space between the clamp assembly 210 and the conduit 102 (see FIGS. 9A and 9B shown later).

Figure 6:
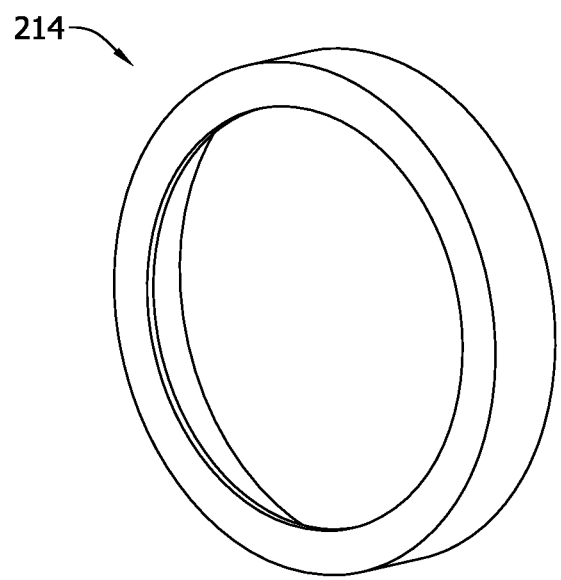
FIG. 6 is a perspective view of an exemplary second gasket in the condulet assembly of the raceway shown in FIG. 2A.

FIG. 6 is a perspective view of an exemplary second gasket 214. In the exemplary embodiment, the second gasket 214 forms into a ring. The second gasket shown in FIG. 6 is circular, but may be in other shapes that conform to the cross-sectional shape of the conduit 102. The second gasket is fabricated from an elastic material, such as rubber or silicone.

In operation, the second gasket 214 is placed behind the clamp ring 402 of the clamp assembly 210 (see FIG. 2B and FIG. 9A shown later). The second gasket 214 provides a second seal for the raceway 104 to prevent dust and/or water from entering into the raceway through the space behind the clamp assembly and between the clamp assembly 210 and the conduit 102 (see FIGS. 9B and 9C shown later).

Figure 7:
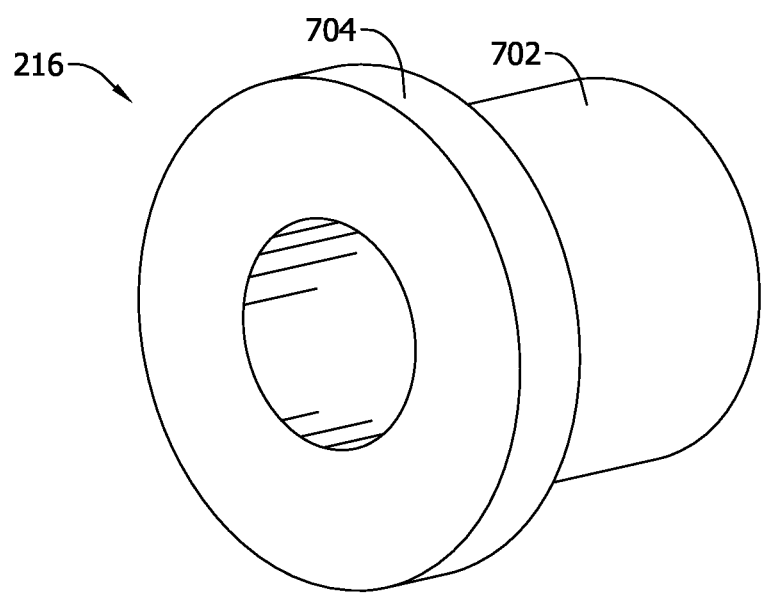
FIG. 7 is a perspective view of an exemplary guide ring in the condulet assembly of the raceway shown in FIG. 2A.

FIG. 7 is a perspective view of an exemplary guide ring 216. In the exemplary embodiment, the guide ring 216 includes a hollow ring body 702 and a ring head 704. The ring head 704 extends outwardly from the ring body 702. The guide ring 216 may form a T-like shape. An outer dimension of the ring body 702 is sized to be received in the mouth 304 of the condulet 202 (see FIGS. 2B and 2C). An inner dimension of ring body 702 is sized to receive the conduit 102. The guide ring 216 is fabricated from metal such as steel. The guide ring 216 may be fabricated from plastic for a raceway 104 of a relatively short duration, such as less than 10 years. The guide ring 216 may be manufactured as one piece or assembled from separate pieces.

Figure 8:
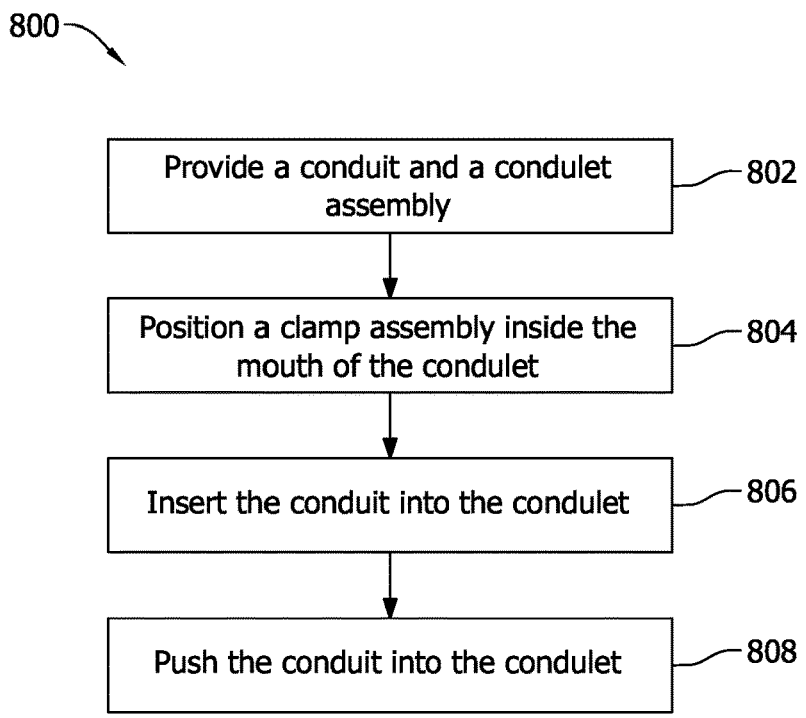
FIG. 8 is a flow chart of an exemplary method of fabricating a raceway using the condulet assemblies shown in FIGS. 2A-7.
Figure 9C:
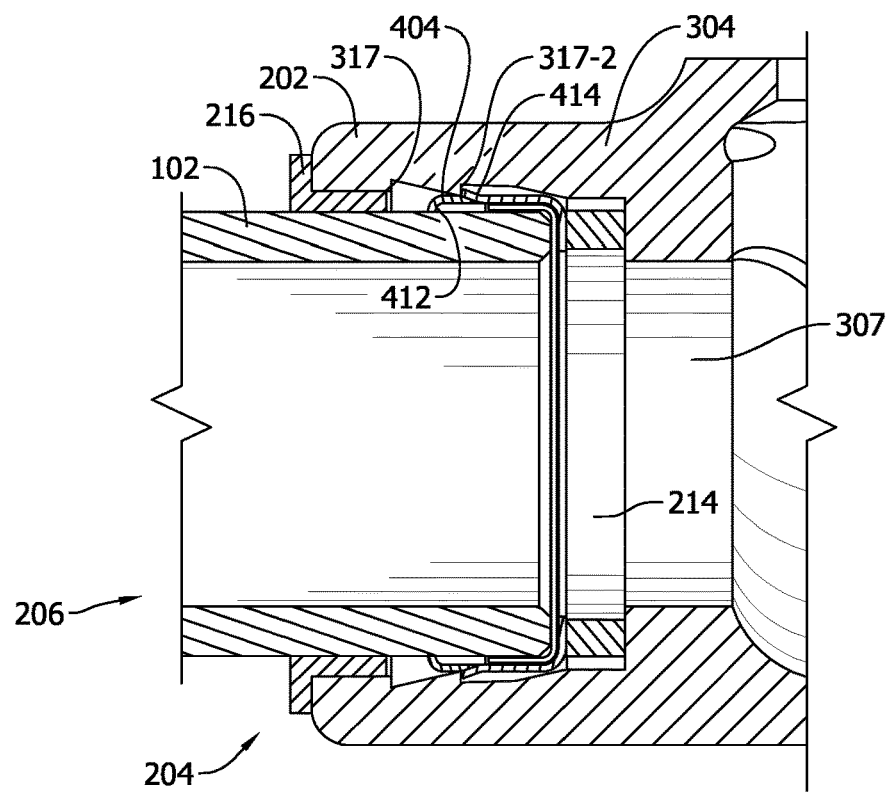

FIGS. 8-9C show an exemplary method 800 of fabricating a raceway of an electrical system. FIG. 8 is a flow chart of the method 800. FIGS. 9A-9C are schematic diagrams of the method 800. The method 800 includes providing 802 a conduit and a condulet assembly. The condulet assembly may be any of the condulet assemblies described above. The condulet assembly 204 may be assembled by positioning 804 the clamp assembly 210 inside the mouth 304 of the condulet 202 (FIG. 9A). In one embodiment, the second gasket 214 is placed inside the mouth 304 of the condulet 202 before the placement of the clamp assembly 210 inside the mouth 304. The first gasket 212 may also be placed inside the clamp assembly 210 to assemble the condulet assembly 204. In some embodiments, the guide ring 216 is placed around the rim 303 of the mouth 304 to assemble the condulet assembly 204.

In the exemplary embodiment, the method 800 also includes inserting 806 an end of the conduit into the condulet assembly. The conduit 102 may be slid along an interior of the guide ring 216. The method 800 further includes pushing 808 the conduit into the condulet until one of the plurality of clamps is positioned in one of the plurality of first sloped recesses (FIG. 9B). In some embodiments, pushing 808 the conduit includes pushing the conduit into the condulet until a first click is produced by the one of the plurality of clamps disposed in the one of the plurality of first sloped recesses. Pushing 808 the conduit may further include pushing the conduit further into the condulet until the flap is disposed in one of the plurality of second sloped recesses (FIG. 9C). In some embodiments, pushing 808 the conduit includes pushing the conduit further into the condulet until a second click is produced by the flap disposed in one of the plurality of second sloped recesses. The coupling of the conduit 102 with the condulet 202 is secure because the clamps 404 and/or flaps 414 hold against the first recess wall 317 and/or the second recess wall 317-2 to counteract a force of pulling the conduit 102 out of the condulet 202. In some embodiments, the claws 412 push against the conduit 102 and the serrations 419 of the claws 412 penetrate into the exterior of the conduit 102, further increasing the traction between the condulet assembly 204 and the conduit 102 and increasing the secureness of the coupling between the conduit 102 and the condulet assembly 204. The condulet 202 may include the shoulder 307. The shoulder 307 prevents the conduit 102 from being inserted too far into the condulet 202. When the conduit 102 is fully inserted into the mouth 304, the second gasket 214 abuts the shoulder 307 (FIG. 9C).

In some embodiments, the conduit 102 may be too heavy to be manually pushed into the condulet 202. A conduit assembly tool may be used, where the tool holds the condulet 202 and the conduit 102 and pushes them toward each other.

The entire fabrication process of the raceway 206 does not need formation of threads on the exterior of the conduits. Neither is pressing on the condulet 202 to couple the conduit 102 with the condulet 202 needed. The raceway 206 is assembled by pushing the conduit 102 into the condulet 202 and the condulet assembly 204.

Because the clamp assembly 210 couples to the exterior of the conduit 102, the slight difference between the outer diameters of an RMC and an IMC of the same trade size does not affect the coupling between the clamp assembly 210 and an RMC 102 or an IMC 102. Further the clamp assembly 210 is fabricated from a steel sheet, which provides tolerance for the slight difference in outer diameters of RMCs and IMCs of the same trade size. Accordingly, the clamp assembly 210 and the condulet assembly 204 of a certain size fits both an RMC and an IMC of the same trade size. As a result, the fabrication process of the raceway 206 is simplified.

At least one technical effect of the condulet assemblies and methods of fabricating a metal conduit raceway in an electrical system includes (a) a condulet assembly for fabricating a metal conduit raceway without forming threads on the metal conduit; (b) a condulet assembly for fabricating a metal conduit raceway by pushing the metal conduit into a condulet; (c) fabricating a metal conduit raceway without requiring the metal conduit to have threads; (d) fabricating a metal conduit raceway by pushing the metal conduit into a condulet assembly; and (e) signaling the coupling of a metal conduit and a condulet with clicks.

An embodiment of a condulet assembly for fabricating a metal conduit raceway of an electrical system is disclosed. The condulet assembly includes a condulet sized to receive a rigid or intermediate metal conduit of the metal conduit raceway and a clamp assembly. The condulet includes a condulet body and a mouth including a mouth wall extending from the condulet body and forming a rim of the mouth. The mouth wall further includes a plurality of first sloped recesses positioned circumferentially in an interior of the mouth wall, each of the plurality of first sloped recesses including a first slope that has a first end and a raised end being raised relative to the first end, the raised end positioned opposite the first end and more distal to the rim than the first end. The clamp assembly includes a clamp ring and a plurality of clamps each including a longitudinal portion and a claw, the longitudinal portion extending longitudinally from the clamp ring, and the claw extending transversely and inwardly from the longitudinal portion. Each of the plurality of clamps is sized to be received in one of the plurality of sloped recesses.

Optionally, a number of the plurality of first sloped recesses is even and each of the plurality of first sloped recesses is positioned symmetrically to one of the plurality of first sloped recesses relative to a longitudinal axis of the mouth. The claw includes serrations at an end of the claw. The longitudinal portion of one of the plurality of clamps further includes a flap having a first end and a second end opposite the first end, the flap extending from the longitudinal portion at the first end of the flap outwards and away from the longitudinal portion. The mouth wall further includes a plurality of second sloped recesses positioned circumferentially in the interior of the mouth wall, each of the plurality of second sloped recesses including a second slope that has a first end and a raised end being raised relative to the first end, the raised end positioned opposite the first end and more distal to the rim than the first end, one of the plurality of second sloped recesses sized to receive the flap therein. The condulet assembly further includes a first gasket sized to be received in the clamp assembly. The condulet assembly further includes a guide ring sized to be positioned around the rim of the mouth. The condulet assembly is sized to connect with a rigid metal conduit and an intermediate metal conduit of the same trade size.

An embodiment of a method of fabricating a metal conduit raceway of an electrical system is disclosed. The method includes providing a rigid or intermediate metal conduit and a condulet assembly, the condulet assembly including a condulet sized to receive the conduit. The condulet includes a condulet body and a mouth including a mouth wall extending from the condulet body and forming a rim of the mouth. The mouth wall further includes a plurality of first sloped recesses circumferentially positioned in an interior of the mouth wall, each of the plurality of first sloped recesses including a first slope that has a first end and a raised end being raised relative to the first end, the raised end positioned opposite the first end and more distal to the rim than the first end. The method also includes assembling the condulet assembly by positioning a clamp assembly inside the mouth. The clamp assembly includes a clamp ring and a plurality of clamps each including a longitudinal portion and a claw, the longitudinal portion extending longitudinally from the clamp ring, and the claw extending transversely and inwardly from the longitudinal portion. Each of the plurality of clamps is sized to be received in one of the plurality of first sloped recesses. The method further includes inserting the conduit into the mouth of the condulet and pushing the conduit into the condulet until one of the plurality of clamps is disposed in one of the plurality of first sloped recesses.

Optionally, pushing the conduit further includes pushing the conduit into the condulet until a first click is produced by the one of the plurality of clamps being disposed in the one of the plurality of first sloped recesses. The longitudinal portion of one of the plurality of clamps further includes a flap having a first end and a second end opposite the first end, the flap extending from the longitudinal portion at the first end of the flap outwards and away from the longitudinal portion. The mouth wall further includes a plurality of second sloped recesses positioned circumferentially in the interior of the mouth wall. Each of the plurality of second sloped recesses includes a second slope that has a first end and a raised end being raised relative to the first end, the raised end positioned opposite the first end and more distal to the rim than the first end, one of the plurality of second sloped recesses sized to receive the flap therein. Pushing the conduit further includes pushing the conduit further into the condulet until the flap is disposed in one of the plurality of second sloped recesses. Pushing the conduit further includes pushing the conduit further into the condulet until a second click is produced by the flap being disposed in the one of the plurality of second sloped recesses. Assembling the condulet assembly further includes positioning a first gasket in the clamp assembly. Assembling the condulet assembly further includes positioning a second gasket inside the mouth before positioning the clamp assembly inside the mouth. Assembling the condulet assembly further includes positioning a guide ring around the rim of the mouth, and inserting the conduit further includes inserting the conduit into the condulet by sliding the conduit along an interior of the guide ring. The claw includes serrations at an end of the claw. A number of the plurality of first sloped recesses is even and each of the plurality of first sloped recesses is positioned symmetrically to one of the plurality of first sloped recesses relative to a longitudinal axis of the mouth. The condulet assembly is sized to connect with a rigid metal conduit and an intermediate metal conduit of the same trade size While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from that described and depicted without departing from inventive concepts described. Also, in certain embodiments, certain components in the assemblies described may be omitted to accommodate particular types of conduit or the needs of particular installations, while still providing cost-effective cold press-fit coupling connections of conduits for electrical wiring or cabling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A condulet assembly for fabricating a metal conduit raceway of an electrical system, comprising:
   a condulet sized to receive a rigid or intermediate metal conduit of the metal conduit raceway, the condulet comprising:
   a condulet body; and
   a mouth comprising a mouth wall extending from the condulet body and forming a rim of the mouth, wherein the mouth wall further comprises a plurality of first sloped recesses positioned circumferentially in an interior of the mouth wall, each of the plurality of first sloped recesses including a first slope that has a first end and a raised end being raised relative to the first end, the raised end positioned opposite the first end and more distal to the rim than the first end; and
   a clamp assembly comprising:
   a clamp ring; and
   a plurality of clamps each comprising a longitudinal portion and a claw, the longitudinal portion extending longitudinally from the clamp ring, and the claw extending transversely and inwardly from the longitudinal portion,
   wherein each of the plurality of clamps is sized to be received in one of the plurality of first sloped recesses.

2. The condulet assembly of claim 1, wherein a number of the plurality of first sloped recesses is even and each of the plurality of first sloped recesses is positioned symmetrically to one of the plurality of first sloped recesses relative to a longitudinal axis of the mouth.

3. The condulet assembly of claim 1, wherein the claw includes serrations at an end of the claw.

4. The condulet assembly of claim 1, wherein the longitudinal portion of one of the plurality of clamps further includes a flap having a first end and a second end opposite the first end, the flap extending from the longitudinal portion at the first end of the flap outwards and away from the longitudinal portion.

5. The condulet assembly of claim 4, wherein the mouth wall further includes a plurality of second sloped recesses positioned circumferentially in the interior of the mouth wall, each of the plurality of second sloped recesses including a second slope that has a first end and a raised end being raised relative to the first end, the raised end positioned opposite the first end and more distal to the rim than the first end, one of the plurality of second sloped recesses sized to receive the flap therein.

6. The condulet assembly of claim 1, further comprising a first gasket sized to be received in the clamp assembly.

7. The condulet assembly of claim 1, further comprising a guide ring sized to be positioned around the rim of the mouth.

8. The condulet assembly of claim 1, wherein the condulet assembly is sized to connect with a rigid metal conduit and an intermediate metal conduit of the same trade size.

9. The condulet assembly of claim 1, wherein at least one of the plurality of clamps extends away from the clamp ring and toward the rim of the mouth.

10. A method of fabricating a metal conduit raceway of an electrical system, comprising:
    providing a rigid or intermediate metal conduit and a condulet assembly, the condulet assembly including a condulet sized to receive the conduit, the condulet including:
    a condulet body; and
    a mouth including a mouth wall extending from the condulet body and forming a rim of the mouth, wherein the mouth wall further comprises a plurality of first sloped recesses circumferentially positioned in an interior of the mouth wall, each of the plurality of first sloped recesses including a first slope that has a first end and a raised end being raised relative to the first end, the raised end positioned opposite the first end and more distal to the rim than the first end;
    assembling the condulet assembly by positioning a clamp assembly inside the mouth, wherein the clamp assembly includes:
    a clamp ring; and
    a plurality of clamps each including a longitudinal portion and a claw, the longitudinal portion extending longitudinally from the clamp ring, and the claw extending transversely and inwardly from the longitudinal portion, wherein each of the plurality of clamps is sized to be received in one of the plurality of first sloped recesses;

inserting the conduit into the mouth of the condulet; and pushing the conduit into the condulet until one of the plurality of clamps is disposed in one of the plurality of first sloped recesses.

11. The method of claim 10, wherein pushing the conduit further comprises pushing the conduit into the condulet until a first click is produced by the one of the plurality of clamps being disposed in the one of the plurality of first sloped recesses.

12. The method of claim 10, wherein the longitudinal portion of one of the plurality of clamps further includes a flap having a first end and a second end opposite the first end, the flap extending from the longitudinal portion at the first end of the flap outwards and away from the longitudinal portion.

13. The method of claim 12, wherein the mouth wall further includes a plurality of second sloped recesses positioned circumferentially in the interior of the mouth wall, each of the plurality of second sloped recesses including a second slope that has a first end and a raised end being raised relative to the first end, the raised end positioned opposite the first end and more distal to the rim than the first end, one of the plurality of second sloped recesses sized to receive the flap therein, and pushing the conduit further comprises pushing the conduit further into the condulet until the flap is disposed in one of the plurality of second sloped recesses.

14. The method of claim 13, wherein pushing the conduit further comprises:

pushing the conduit further into the condulet until a second click is produced by the flap being disposed in the one of the plurality of second sloped recesses.

15. The method of claim 10, wherein assembling the condulet assembly further comprises positioning a first gasket in the clamp assembly.

16. The method of claim 10, wherein assembling the condulet assembly further comprises positioning a second gasket inside the mouth before positioning the clamp assembly inside the mouth.

17. The method of claim 10, wherein assembling the condulet assembly further comprises positioning a guide ring around the rim of the mouth, and inserting the conduit further comprises inserting the conduit into the condulet by sliding the conduit along an interior of the guide ring.

18. The method of claim 10, wherein the claw includes serrations at an end of the claw.

19. The method of claim 10, wherein a number of the plurality of first sloped recesses is even and each of the plurality of first sloped recesses is positioned symmetrically to one of the plurality of first sloped recesses relative to a longitudinal axis of the mouth.

20. The method of claim 10, wherein the condulet assembly is sized to connect with a rigid metal conduit and an intermediate metal conduit of the same trade.

* * * * *